3,294,451
LEG HAMMOCK
Kenneth U. Quy, 830 Lakeside Drive,
Wichita, Kans. 67203
Filed Aug. 9, 1965, Ser. No. 478,384
11 Claims. (Cl. 297—427)

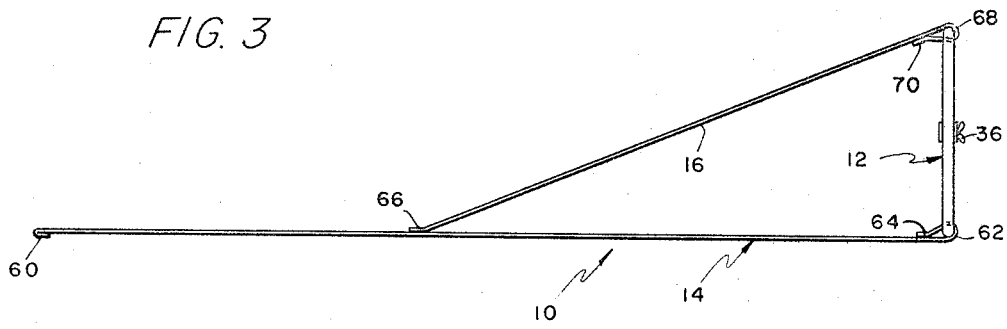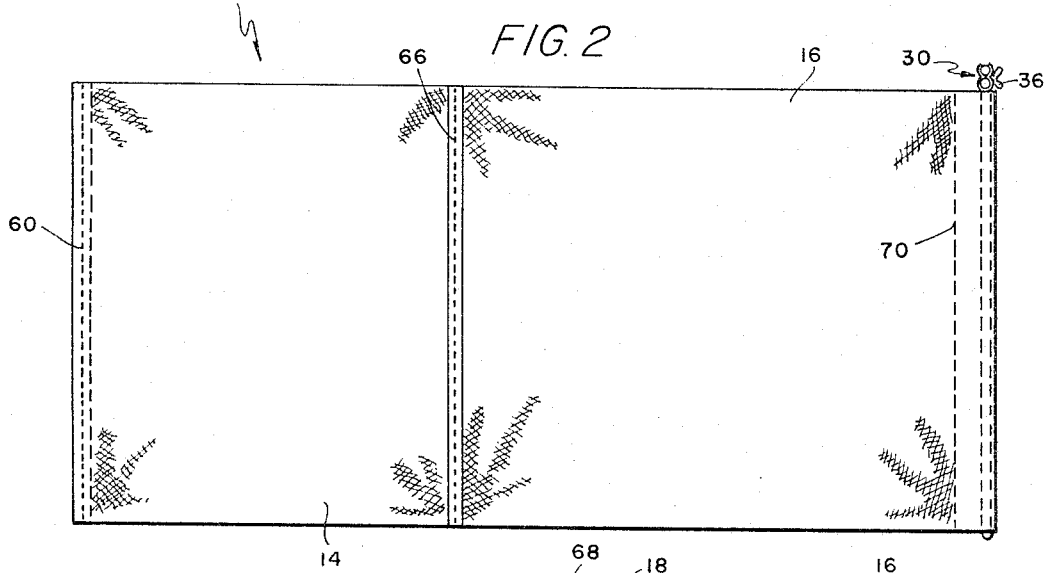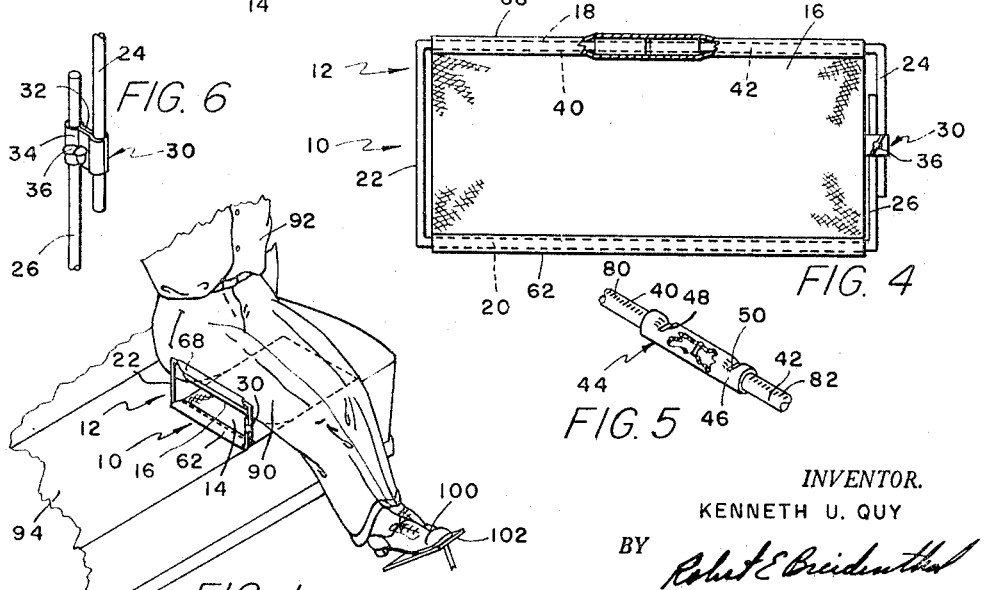

This invention relates to new and useful improvements in apparatus for use in conjunction with automobile seats or the like for affording upward and lateral support for the thigh portion of the leg of a seat occupant, and more particularly pertains to apparatus of such character which is collapsible for convenient storage such as in a glove compartment conventionally associated with an automobile instrument panel.

Many types of seats include only one and in many instances no sides against which the seat occupant obtains lateral support for the upper or thigh portions of his legs. The absence of such lateral support is not especially tiring when the person is seated only for a short period of time, or when the seat occupant has frequently occurring opportunities to rise to his feet and perhaps move about so as to relieve incipient muscle fatigue. For example, an occupant of a seating bench such as provided in grandstands and the like will during observation of spectator sports such as baseball or football have numerous occasions to rise to his feet and relieve any degree of incipient muscle fatigue occasioned by lack of lateral support for the outer thigh portions of his legs, and under such circumstances the chief source of discomfort will be such as arising from the hardness of the seat and from the lack of support for the back when the bench or seat does not include a back portion. Also, occupants of grandstand benches or seats ordinarily use such seats for a relatively short period of time on the order of, say, about one to three hours, and such relatively short period of seat occupancy coupled with the opportunity to frequently rise to the feet and flex the leg muscles serves to prevent the absence of lateral leg support from becoming excessively tiring or fatiguing.

Unfortunately, however, the situation is quite a lot different in seating environments such that the seat occupant must remain seated for prolonged periods with little or no opportunity to rise to his feet in order to relieve muscle fatigue, and under such circumstances even when the seat is cushioned and the seat includes a back against which the seat occupant may rest his back the absence of lateral support for the outer thighs of the seat occupant can become very tiring and result in a progressively increasing degree of discomfort. Indeed, under such circumstances it appears that the rate of increase in discomfort tends to increase exponentially.

While seat occupants of seats that do not provide lateral thigh support can frequently cope with the problem of increasing discomfort by twisting sidewise on the seat from time to time, crossing the legs, bending one leg to place the foot thereof under the thigh of the other leg, and the like, this freedom of movement is not available to or is at most available in a very limited measure to the driver of an automobile, and this is especially true with respect to the right leg of an automobile driver. Obviously, an automobile driver must in giving proper attention to operation of the automobile refrain from such muscle fatigue relieving maneuvers as mentioned previously, and indeed is so limited with respect to his right leg that he must for sustained periods of time keep his foot in one well defined position, namely, the accelerator or gas pedal. Accordingly, it is a common experience of automobile drivers in making automobile drives of one hundred miles or more when seated upon a seat such that no lateral support is afforded for the thigh of the right leg that the driver will successively experience a minor degree of discomforture which can be temporarily alleviated by shifting the knee of his right leg to the left and to the right while, of course, keeping his foot in the immediate vicinity of the accelerator, thence reaching a stage in which the degree of discomforture is very much a nuisance and from which it is difficult to divert his attention, and finally a very, very annoying and persistent ache that is continuously distracting and which may impair to a substantial extent the driver's ability to give proper attention to operation of the automobile to become a real hazard to safety.

In view of the foregoing, it is the primary object of the present invention to provide a seating accessory which can be used in conjunction with any seat not having one or two sides so as to provide lateral support for the thighs, and particularly, such a seating accessory which will minimize and preferably entirely eliminate muscle fatigue of the right leg of an automobile driver even during sustained periods of driving.

Another important object of the invention is to provide a seating accessory of the character specified above which may be conveniently adjusted by the user thereof to any position that he may desire to occupy upon the seat, and the device preferably also being such that for a given size thereof the same can be employed by drivers without regard to the size of the latter.

Still another object of the invention is to provide a device of the character specified above which can be collapsed and be such as to occupy a minimum of space when so collapsed so as to be readily stored, such collapsibility and storability being desired when circumstances might otherwise subject the device to being a potential subject of theft, and when a driver is undertaking a short drive such that no discomforture will result from the absence of providing lateral support for the thigh.

Another very important object of the invention is to provide a method of making the seating accessory so that the same may be produced by the use of simple tools requiring a minimum of skilled craftsmen, and so as to minimize manufacturing costs.

Important features of the invention reside in the provision of an open, generally rectangular open framework of a relatively stiff and preferably flexible and resilient material, such open framework constituting in effect one side of a generally triangular configuration relatively resistant to compression in its extent, with the other two sides of the generally triangular configuration being defined by flexible sheets of material with one of the latter providing the lateral and upward support for the thigh portion of the leg of a user.

Another important feature of the invention resides in provision of an adjustable side of the frame which can be secured in adjusted length so as to better conform the device to the shape of the leg of the user.

A broad aspect of the invention involves the provision of an automobile seat accessory for leg support of a seat occupant comprising, an elongated flexible sheet folded upon itself and having opposite end edges in spaced and approximate parallelism, and substantially rigid means for maintaining said end edges in substantially relatively fixed relationship.

Still another important aspect of the invention resides in providing the method of making an automobile seat accessory for leg support of a seat occupant comprising the step of forming loops in opposite ends of a sheet of flexible material, the step of bending a length of metallic wire to form four spaced approximate right angles therein in a single direction to give the wire a generally rectangular overall configuration with the opposite ends of the wire being in the proximity of each other, the step of inserting the bent wire through the loops to dispose the latter about the wire, and the step of thereafter securing the opposite ends of the wire together to form an endless generally rectangular configuration.

Another important aspect of the invention comprises the method defined in the preceding paragraph coupled with the further step of thereafter sliding the loops on the wire to positions such that they are separated from each other along the extent of the bent wire by two of said right angles.

Other objects, features and advantages of the invention will become apparent during the ensuing description of a preferred embodiment thereof, such description to be made in conjunction with the accompanying drawings, wherein:

FIGURE 1 is an isometric view partially illustrating an automobile driver's seat and the automobile accessory, together with partially illustrating the occupant or driver seated upon the automobile seat, and the device of this invention with hidden details of the latter being indicated in dashed outline;

FIGURE 2 is a top plan view of the seating accessory of this invention;

FIGURE 3 is a front elevational view of the device shown in FIGURE 2;

FIGURE 4 is an end view of the device shown in FIGURES 2 and 3;

FIGURE 5 is an enlarged isometric detail view with portions of the structure being broken away to show the means for securing the opposite ends of the rectangular shaped frame together; and, FIGURE 6 is an enlarged fragmentary isometric view of the structure provided for adjusting the length of an end of the rectangular frame.

Referring now to the drawings, wherein like numerals designate like parts throughout the various views, the numeral 10 designates generally the device of this invention for providing leg support.

The device or seating accessory 10 comprises an open, generally rectangular frame designated generally at 12, a flexible sheet or base designated generally at 14, and a flexible leg supporting sheet designated at 16.

The frame 12 comprises upper and lower substantially straight portions 18 and 20 that are spaced apart and which are preferable approximately parallel to each other. At one end of the frame 12, extremities of the frame portions 18 and 20 are connected by a frame portion 22, the latter preferably being integral with at least the adjacent parts of the frame portions 18 and 20 to which it is connected. While the ends of the frame portions 18 and 20 at the end of the frame 12 remote from the frame portion 22 can be connected in the same manner as the end of the frame remote therefrom, it is preferred that the ends of the frame portions 18 and 20 remote from the frame portion 22 be provided with right angled extensions integral therewith such as indicated at 24 and 26. The extensions 24 and 26 respectively extend toward the frame portions 20 and 18, and in closely spaced parallelism to each other. The arrangement is such that the side of the frame 12 remote from the side or frame portion 22 is adjustable in length by varying the amount of overlap of the extensions 24 and 26, it being noted that the material of which the frame portions 18, 20 and 22 are made are sufficiently flexible or resilient so as to accommodate sufficient flexure to vary the extent of overlap of the frame extensions 24 and 26. Means is provided for securing the frame extensions 24 and 26 together in any selected or adjusted extent of overlap, such means being designated generally at 30 and being comprised of a pair of clamping elements 32 and 34 disposed on opposite sides of the overlapping extents of the extensions 24 and 26, with a threaded bolt extending through central aligned apertures, not shown, in the clamping elements 32 and 34, and a wing nut 36 is threaded upon the bolt so that on tightening the wing nut 36 the clamping members 32 and 34 are urged forcibly together so as to tightly clamp the extensions 24 and 26 therebetween and to retain such extensions 24 and 26 in fixed relationship relative to each other. Preferably, in order to preclude inadvertent dislodgement or loss of the clamping means 30, either one or both of the clamping elements or members 32 and 34 are brazed or welded to the frame extension 24. It will be appreciated that the clamp means 30 may be considered as being provided for either one or both of two purposes, namely, adjustability in the length of one side of the frame 20, and means affording selective opening or closing of the continuous extent of the open, generally rectangular frame 12. Should the adjustability feature not be deemed desirable or necessary, it is not necessary that the clamp 30 be provided at all, and the side of the frame 12 constituted of the extensions 24 and 26 can be formed of a single continuous and integral portion such as that indicated at 22.

In addition to or in lieu of the provision of the overlapping extensions 24 and 26 and the clamping means 30 is the construction of the frame 12 wherein the portion 18 thereof is of two-piece construction and comprises two opposed sections 40 and 42 that have their free ends in substantially abutting relationship about midway along the extent of the frame portion 18. Means is provided for securing the frame sections 40 and 42 that constitute the frame portion 18 together, such means being designated generally at 44 best shown in FIGURE 5. Such means 44 comprise a sleeve 46 receiving the frame sections 40 and 42 therein from the opposite ends of the sleeve 46, and the sleeve 46 being in turn fixedly secured to each of the sections 40 and 42 so as to secure such sections together, this being by the sleeve being indented at 48 and 50 as by striking with a suitable tool so that such indentations 48 and 50 bulge the inner wall of the sleeve 46 to a sufficient extent to indent the sections 40 and 42 and cause the indentations 48 and 50 in the sleeve to interlock therewith. In assembling the sleeve 46 upon the sections 40 and 42, the sleeve 46 is initially slidable upon the frame sections 40 and 42, and the indentations 48 and 50 are formed after the ends of the sections 40 and 42 are received within the sleeve 46. Those skilled in the art will recognize that the securing means 44 is conventional and further detailed description thereof is deemed unnecessary other than to mention that the sleeve 46 is metallic and preferably made of a material such as aluminum or steel, though others can be used, and the sections 40 and 42 are also metallic and preferably are formed of a metal such as steel wire or metal rod whereby the formation of the indentations 48 and 50 securely interlocks the sleeve 46 with the sections 40 and 42.

In the preferred construction the frame 12, which as will be seen presently must possess considerable rigidity or stiffness, is made of heavy gauge wire such as #9 steel, for example, which if desired can be plated or coated with a corrosion protective or ornamental surface such as zinc, cadmium, plastic, nickel, chromium by conventional processes or even plastics such as are often used to coat metals by dipping, spraying and the like. Preferably, though not necessarily, any such coatings are applied to the wire after the right-angle bends are formed at the opposite ends of the frame portion 22 and at the junctures of the extensions 24 and 26 so that the application of excessive stress to the protective coating is avoided.

It will be appreciated that when the frame 12 is made in the form illustrated in FIGURE 4 so as to include the extensions 24 and 26 together with the clamp means 30 that it is not essential that the portion 18 be formed from two distinct and separate sections joined by the means 44, and that under such circumstances the sections 40 and 42 may be integral and of the same nature as the single continuous length of wire defining the frame portion 20.

The flexible base 14 is comprised of a flexible rectangular flat sheet or panel of preferably pervious material such as a textile fabric with cotton being preferred, such flexible sheet being hemmed at one end 60 to prevent raveling and having a loop 62 formed along its remote end by being folded over upon itself and secured together by a row of stitching such as indicated at 64. As clearly shown in the drawings, the length of the loop 62 corresponds to the length of the frame portion 20, and the latter extends through the loop 62 as clearly shown in FIGURE 4. Another rectangular sheet or panel of flat material such as cotton fabric constitutes the leg support 16, and the latter has one end thereof secured to the sheet or base 14 intermediate the ends of the latter by a row of stitching 66 as clearly shown in FIGURE 2. The other end of the sheet 16 has a loop 68 formed therein by being folded over upon itself and stitched together as by the row of stitching 70. The length of the loop 68 corresponds approximately to the length of the frame portion 18, and as clearly shown in FIGURE 4, the frame portion 18 extends through the loop 68. In order to increase friction between the loop 68 and the frame portion 18 when the sheet 16 is tensioned so that the loop 68 pulls upon the frame 12, the upper edges of the frame portion 18 are serrated or roughened as indicated at 80 and 82 with respect to the frame sections 40 and 42 in FIGURE 5.

The use of the device 10 will be readily appreciated upon referring to FIGURE 1, wherein the device 10 is shown as being employed to give lateral support to the outside of the right thigh 90 of an automobile driver indicated at 92. The device 10 is positioned so that the sheet or flexible base element 14 lies flush against or directly upon the upper surface of the automobile seat 94 with the frame 12 being disposed immediately adjacent the outer side of the right thigh 90 of the automobile driver 92. Each of the sheets 14 and 16 are tensioned between their juncture at the row of stitching 66 along their extents to the frame 12, and this may be accomplished by the automobile driver 92 using his left hand to pull or apply tension to the end of the sheet or base 14 along the hemmed edge 60 to draw the frame 12 toward his right thigh 90.

After the automobile driver has positioned the device 10 and seated himself thereon as indicated in FIGURE 1, the sheet 16 is deformed into a concave configuration that bears against the thigh 90 in such a manner as to support vertically as well as to provide lateral support to the thigh 90, and with the thigh 90 so supported, the operator may remain seated with his foot 100 bearing upon the gas pedal or accelerator and being held parallel to the plane of motion of the accelerator 102 of an automobile for a prolonged period of time without experiencing any fatigue or discomforture such as is normally encountered in the absence of lateral support for the thigh 90.

The strength of the support forces are attributable to the generally triangular configuration defined by the frame 12 and the extents of the sheets 14 and 16 therefrom to their juncture, whether such juncture actually occurs in use of the device 10 at the row of stitching 66 or in closer proximity to the frame 12 in a manner resulting from the weight of the automobile driver 92 resting upon the sheet 16. The relationship is such that in such triangular configuration the portions of the sheets 14 and 16 extending from the frame 12 to the juncture of such sheets are in tension, whereas the frame 12 is in compression. Accordingly, since the loads imposed upon the sheets 14 and 16 are tensile in character, they may be flexible and need only possess adequate strength in tension rather than in compression. On the other hand, the frame 12 must and does possess strength in compression so as to resist loads imposed thereon such as to urge the frame portions 18 and 20 towards each other.

The provision of the adjustable feature of the frame 12 constituted of the optional provision of the extensions 24 and 26 and the clamping means 30 for securing such elements in adjusted overlapping relationship enables the automobile driver 92 to vary the degree of supporting forces applied to his thigh 90 along the length of the latter, such adjustability being such that the extensions 24 and 26 can be clamped together with less overlapping extents to increase the supporting forces applied to the lower portion of the thigh 90, and conversely, the extensions 24 and 26 can be clamped in a position by the clamping means 30 so as to increase their overlapping extents so as to relatively lessen the supporting forces applied to the lower portion of the thigh 90, as will be evident.

As mentioned previously, when the adjustment means constituted of the extensions 24 and 26 and the clamping means 30 is provided, it is optional whether the frame portion 18 include separate sections 40 and 42 secured by the means 44 in that the frame portion 18 can under such circumstances be integral and correspond to that of the frame portion 20 shown in FIGURE 4. When, however, the side of the frame 12 constituted of the extensions 24 and 26 and the clamping means 30 is alternatively constructed so as to correspond to the frame portion 22 shown in FIGURE 4, it is preferred that the frame portion 18 be constituted of the separate sections 40 and 42 joined by the means 44 previously described. The reason for such preference that the frame 12 be constructed in such a manner that at least during one stage of its manufacture the same can be opened rather than being as is, of course, possible a single continuous length of heavy gauge wire without ends will be evident during the ensuing description of a preferred method for making the device 10.

The preferred method of making the device 10 comprises providing a generally rectangular open frame, with the extent of the frame being open at some position along its length. This can most conveniently be accomplished by bending a length of heavy gauge wire so as to provide four spaced approximate right angles therein with the free ends of the wire being in close proximity to each other. In this description of the method of making the device 10, the length of heavy gauge wire may alternatively be considered as having included within its length either contiguous portions of its length secured by securing means 44 or as being formed by two lengths of wire having an overlapping extent secured by the clamping means 30.

With the open generally rectangular frame having been defined by bending the heavy gauge wire or metallic rod and having free ends in proximity to each other, one or both of such free ends are passed through previously formed loops formed at the opposite ends of a sheet of material, the sheets 14 and 16 intermediate the juncture 66 and the frame 12 being considered a single sheet of material. After the frame 12 has been inserted through the loops, the free ends of the bent length of wire or rod are secured together, either by means of the securing means 44 or the clamping means 30, and the sheets 14 and 16 positioned on the frame 12 in the position shown thereof in the drawings.

As described above, the sheets 14 and 16 joined at 66 are considered as constituting a single sheet of material and indeed such is, of course, quite possible in actual practice. It will, of course, be understood that in making the construction shown in the drawings that it is possible to secure the sheets 14 and 16 (if they are not to be in fact a single sheet of material) together by the row of stitching 66 at any time, either prior to or after the frame 12 has been positioned through the loops 62 and 68. It is preferred that loops 62 and 68 be stitched before being positioned on frame 12, though of course this particular sequence is not essential to arriving at the finally desired product 10. If the loops 62 and 68 are formed at opposite ends of a single continuous length of flexible material, the same can have attached thereto at a position intermediate its ends an end of a second sheet of material by stitching or the like so as to constitute the extent of the sheet 14 shown in FIGURES 2 and 3 between the hem 60 and the row of stitching 66. Indeed, it is not absolutely essential, though preferred, that the device 10 include the extent of sheet 14 between the hem 60 and the stitching 66 inasmuch as in use of the device 10 the extents of the sheets 14 and 16 between the frame 12 and the juncture 66 are in part forced together by the weight of the person seated thereon so as to define at a position intermediate the juncture 66 and the frame 12 a line of contact between such sheets from which line the sheets 14 and 16 thereafter diverge to the frame 12. Provision of the extent of the sheet 14 from the hem 60 to the juncture 66 is preferred for the reason that an overall economy of material forming the sheets is realized (if only a single sheet is used it must have an overall length approximately equal to twice the length of the sheet 14 between the hem 60 and the loop 62 thereof) and for the reason that tension upon the device so as to define a triangle with the row of stitching 66 at the apex thereof is most conveniently accomplished by such provision and results in the frame 12 being properly inclined to the automobile seat 94 in use and being disposed at the base of an approximate isosceles triangle.

It will be appreciated that it is preferred that the sheets 14 and 16 be perforate or pervious to air so as not to shut off air circulation to the portion of the body of the operator 92 resting thereon, though of course this is not essential. It is also preferred that the material of the sheets 14 and 16 possess sufficient frictional character so that when the driver 92 is seated thereon that the same will neither slip with respect to the driver 92 nor with respect to the automobile seat 94. When the loop 68 is properly placed on the frame portion 18 as shown in the drawings, and the automobile driver 92 is seated thereon, the serrations 80 and 82 on the frame portion 18 prevents any tendency of the sheet 16 and the loop 68 thereof to slide upon the frame portion 18 so as might otherwise tend to bunch towards either the front or rear end of the frame portion 18.

When it is not desired to use the device 10, the sheets 14 and 16 can be conveniently rolled or wrapped around the frame 12 so as to occupy a very minimum of space such that the same can be stored in a conventional instrument panel glove compartment or simply placed in the space ordinarily existing between the floor board and the underside of the driver's seat.

The device 10 in addition to its primary function also constitutes a very inexpensive and particularly appropriate vehicle for advertising suitable for use by motels, petroleum companies, etc. The cost is so low to produce the device 10 with advertising printed on the sheets 14 and 16 thereof that the same can be used as a giveaway device. In other words, advertising of a chain motel with perhaps a map indicating motel sites, or alternatively, advertising of a particular brand of gasoline may be imprinted on the fabric of the sheets 14 and 16 and given to customers or those likely to become customers of the enterprises.

The structure of the device 10 as well as the method of making the same will be fully understood from the foregoing, each having been described in elaborate detail in order to assure a full and complete understanding of the principles of the invention. Obviously, the device 10 as well as the described method of making the same are subject to numerous variations and modifications without departing from the spirit of the invention, and accordingly, attention is directed to the appended claims in order to ascertain the actual scope of the invention.

I claim:

1. An automobile seat accessory for leg support of a seat occupant comprising, a substantially rigid base having substantially coplanar and elongated upper and lower spaced sheet mounting portions, a first sheet of flexible material having an edge secured to the lower sheet mounting portion of the base, a second sheet of flexible material having an edge secured to the upper sheet mounting portion of the base, and said sheets being connected to each other at a position more remote from the base than the spacing of said portions of the base, each of the sheets having an extent intermediate its secured edge and the position of connection to the other sheet at least one and one-half times as great as the spacing of the spaced mounting portions of the base.

2. The combination of claim 1, wherein each of said sheets has an edge remote from the base, with the remote edge of the second sheet being connected to the first sheet at a position intermediate the edges of the latter.

3. An automobile seat accessory for leg support of a seat occupant comprising, an elongated flexible sheet folded upon itself and having opposite end edges in spaced and approximate parallelism, and substantially rigid means for maintaining said end edges in substantially relatively fixed relationship, said sheet having an extent intermediate its end edges at least three times as great as the substantially fixed spacing of the end edges.

4. The combination of claim 3, wherein said means comprises an open frame of generally quadrilateral configuration including opposed upper and lower portions, and opposed front and rear side portions, and said end edges of the sheet being secured to the upper and lower portions of the frame.

5. The combination of claim 4, wherein the frame is made of a stiff and resilient material.

6. The combination of claim 5, wherein at least one of said side portions is extensible, and means carried by each extensible side portion for securing the same in any selected extensible position.

7. The combination of claim 4, wherein the end edges of the sheet are secured to the upper and lower portions of the frame by means of each of such end edges having a loop formed therein extending the length of the edge with the frame portion being received therethrough.

8. The combination of claim 7, wherein the upper frame portion is slidably received through the loop, and said upper frame portion having a roughened surface for frictionally engaging the loop embracing the same.

9. The combination of claim 3, including a second sheet of flexible material having an edge attached to the first mentioned sheet at a position intermediate the ends of the latter, whereby tensioning the second sheet and the entire length of the first mentioned sheet from said means forms an acute dihedral angle of less than 45° in the first sheet having its apex along the edge of the second sheet that opens toward said means.

10. An automobile seat accessory for leg support of a seat occupant comprising, a generally rectangular and open frame formed of stiff metallic wire including spaced upper and lower opposed portions, elongated first and second flexible sheets each having first and second ends, with the first ends of each sheet having a loop formed therein, said upper and lower frame portions being respectively received through the loops of the first ends of the first and second sheets, said first sheet having a length shorter than the second sheet and at least one and one-half times the spacing of the upper and lower portions of the frame, and the second end of the first sheet being secured to the second sheet intermediate the ends of the second sheet.

11. The combination of claim 10, wherein said frame includes a side portion comprised of overlapping and oppositely extending wire sections respectively attached to the upper and lower portions of the frame, said frame being sufficiently flexible and resilient whereby the extent of overlapping of the wire sections can be selectively varied, and means for securing the wire sections with selected overlapping extent.

References Cited by the Examiner

UNITED STATES PATENTS

| | | | |
|---|---|---|---|
| 1,682,071 | 8/1928 | Finn | 297—418 X |
| 1,891,747 | 12/1932 | Clements | 5—327 X |
| 2,300,382 | 10/1942 | Hardy | 29—163.5 |
| 2,564,915 | 8/1951 | Nelson | 297—441 X |
| 2,769,486 | 11/1956 | Rabinovitch et al. | 5—327 |
| 3,017,220 | 1/1962 | Chernivsky | 297—441 X |
| 3,067,504 | 12/1962 | Lubben et al. | 29—163.5 |
| 3,215,469 | 11/1965 | Wamsley | 297—427 X |

References Cited by the Applicant

UNITED STATES PATENTS

| | | |
|---|---|---|
| 2,100,737 | 11/1937 | Foster. |
| 2,522,887 | 9/1950 | Nelson. |
| 2,636,550 | 4/1953 | Poyer. |
| 2,650,654 | 9/1953 | Twiford. |
| 2,735,480 | 2/1956 | Mead. |
| 2,772,725 | 12/1956 | Leasure. |

FRANK B. SHERRY, *Primary Examiner.*

CASMIR A. NUNBERG, *Assistant Examiner.*